(12) United States Patent
Fernandez Luque et al.

(10) Patent No.: US 10,700,636 B2
(45) Date of Patent: Jun. 30, 2020

(54) INSTALLATION FOR POWERING AUXILIARY EQUIPMENT IN ELECTRICAL ENERGY GENERATION PLANTS

(71) Applicant: SOLTEC ENERGIAS RENOVABLES, S.L., Murcia (ES)

(72) Inventors: Francisco Jesus Fernandez Luque, Cordova (ES); Jose Antonio Villarejo Manas, Murcia (ES)

(*) Notice: Subject to any disclaimer, the term of this patent is extended or adjusted under 35 U.S.C. 154(b) by 78 days.

(21) Appl. No.: 16/092,252

(22) PCT Filed: Apr. 7, 2016

(86) PCT No.: PCT/ES2016/000044
§ 371 (c)(1),
(2) Date: Oct. 9, 2018

(87) PCT Pub. No.: WO2017/174829
PCT Pub. Date: Oct. 12, 2017

(65) Prior Publication Data
US 2019/0165724 A1 May 30, 2019

(51) Int. Cl.
| | |
|---|---|
| H02S 40/32 | (2014.01) |
| H02J 3/38 | (2006.01) |
| H02S 10/00 | (2014.01) |
| H02S 40/30 | (2014.01) |
| H02H 9/04 | (2006.01) |
| H02J 7/00 | (2006.01) |

(52) U.S. Cl.
CPC ............ H02S 40/32 (2014.12); H02H 9/041 (2013.01); H02J 3/383 (2013.01); H02S 10/00 (2013.01); H02S 40/30 (2014.12); *H02J 7/00* (2013.01)

(58) Field of Classification Search
None
See application file for complete search history.

(56) References Cited

U.S. PATENT DOCUMENTS

| | | | |
|---|---|---|---|
| 2013/0200709 A1* | 8/2013 | Kirchner | H01L 31/02021 307/77 |
| 2013/0320771 A1* | 12/2013 | Adest | H02S 40/36 307/82 |
| 2016/0126741 A1* | 5/2016 | Ito | H02J 1/102 307/82 |
| 2017/0331325 A1* | 11/2017 | Ristau | H02J 3/38 |

* cited by examiner

*Primary Examiner* — Jared Fureman
*Assistant Examiner* — Aqeel H Bukhari
(74) *Attorney, Agent, or Firm* — Eugenio J. Torres-Oyola; Victor M. Rodriguez-Reyes; Ferraiuoli LLC (57) ABSTRACT

The installation comprises:
 a DC-generating arrangement formed by electrical generators (PV1 ... PVn) which are connected in series and located inside a local area, and supply a remote area with a total direct current that is the sum of the current generated by each of the electrical generators (PV1 ... PVn); and
 an auxiliary power supply device (D) which is arranged inside the local area and provides the auxiliary system (E) with a supply voltage in the local area, wherein the auxiliary power supply device (D) is made up of a current-fed power converter (CP) electrically connected in series, respective input terminals (T1, T2), in the DC-generating arrangement between two connection points (p1, p2) of the electrical generators, located inside the local area.

23 Claims, 6 Drawing Sheets

INSTALLATION FOR POWERING AUXILIARY EQUIPMENT IN ELECTRICAL ENERGY GENERATION PLANTS

TECHNICAL FIELD

The present invention relates generally to the field of electricity generation installations located in a given local area and envisaged for supplying electrical energy to a remote area.

Particularly, the present invention relates to an installation for powering auxiliary systems in electricity generation plants such as a solar farm or plant comprising an arrangement of a plurality of electrical generators (in the case of a solar farm, for example, there is one electrical generator per solar collector) connected in line, in series, supplying direct current to a remote area and with at least one auxiliary power supply device in said electricity generation plant intended for supplying a supply voltage to a device (for example, a battery or battery bank) of said local area; and more particularly, the present invention relates to an installation in which the mentioned auxiliary power supply device comprises a current-fed power converter connected in series with the arrangement at any point of the plant. The cited power converter will be connected specifically between any two connection points of said plurality of electrical generators in series, such that the proposed topology is highly flexible.

The invention is particularly applicable to a photovoltaic installation in which the electrical generators are photovoltaic generators.

PRIOR STATE OF THE ART

Many electricity generation installations, particularly photovoltaic electricity generation installations, have to supply power to auxiliary electronic systems, such as solar trackers, monitoring systems, safety systems, etc. In small, grid-connected installations, this does not usually entail a problem since building a small AC installation for powering these systems is fairly simple. If the size of the plant increases and, furthermore, if there is no possibility of grid connection as is the case of a pumping station or an isolated installation, the problem can be solved in a different way. The different solutions offered by the state of the art are indicated below.

Figure 1:
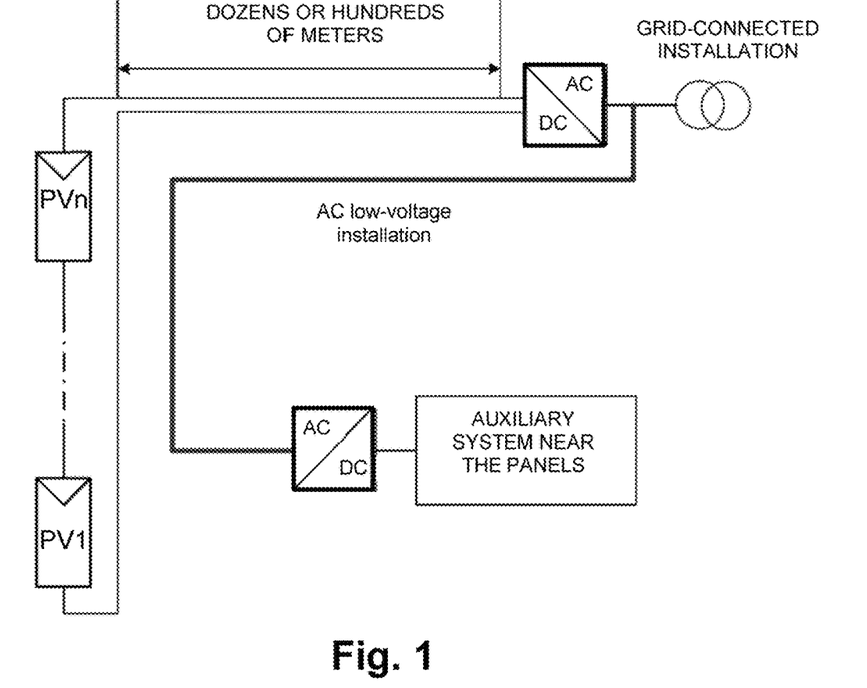
FIG. 1 represents the state of the art and schematically illustrates a photovoltaic electrical energy generation plant connected to a remote power grid, where the installation comprises, in a local area, an auxiliary power supply device including an AC/DC converter connected through a low-voltage installation to a power grid arranged in a remote area.

FIG. 1 shows a photovoltaic generator formed by an in-series photovoltaic panel arrangement PV1 . . . PVn arranged in a local area, where the photovoltaic system is connected to a grid N (through a DC/AC inverter), said arrangement being located in a remote area at a distance L of tens or hundreds of meters from said grid N, and said photovoltaic generator is also connected to auxiliary systems E which must be powered inside the local area. Said auxiliary systems can be of any load operating under direct current at a constant voltage.

The simplest solution is to build a low-voltage installation BT from the grid N to the auxiliary systems E, as shown in the drawing. Given that the auxiliary systems E is mostly electronic systems, an AC/DC converter (power supply source) will have to be included as illustrated in said FIG. 1. However, the highest cost of this solution is possibly associated with laying the cables and channels of the low-voltage installation BT.

Figure 2:
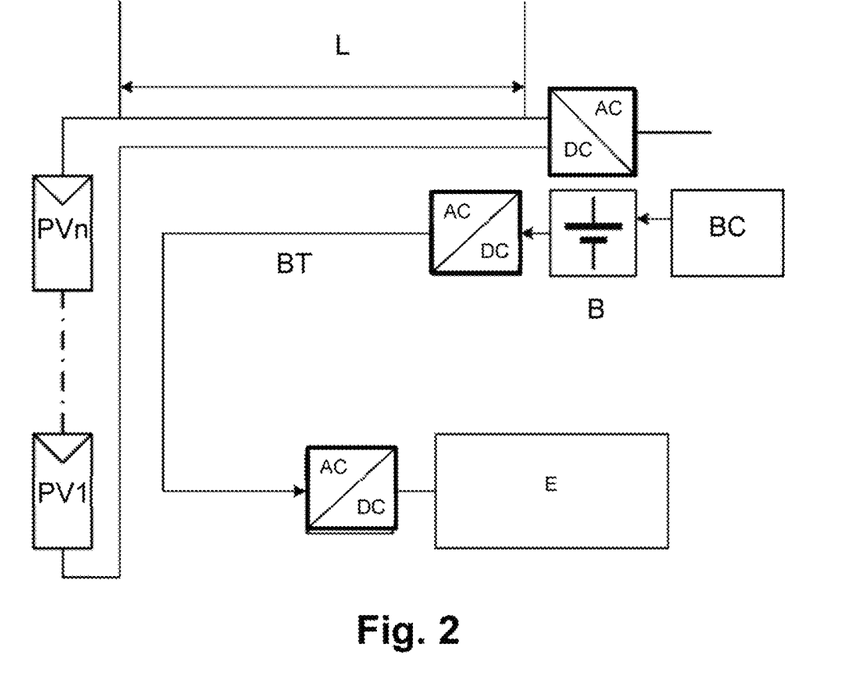
FIG. 2, which also represents the state of the art, shows an isolated or pumping installation where there is no power grid, wherein the auxiliary power supply device, unlike the one in FIG. 1, is powered by an electrical energy storage system, such as a battery.

In some installations, for example in pumping centers, where a power grid is non-existent, it can be replaced with an isolated installation with a storage system that can be powered by any energy source, as shown in FIG. 2, where the storage system is shown with reference B and the energy source with reference BC. In this solution, only the problem regarding the absence of a grid has been solved, given that the low-voltage electrical installation BT continues to exist and there is a further need to add more elements.

If the elimination of the low-voltage installation BT is truly desired regardless of the existence or accessibility of the power grid, energy must be taken from a point close to the auxiliary systems. To that end, a small isolated installation can be built next to the systems or make use of the existing installation so that energy can be taken from an existing string (panels arranged in series). To that end, a DC/DC converter will be required that can withstand the open-circuit voltage of the installation, which in most cases will be close to 1000 V. This converter will have a relatively complex design and will require batteries to provide power peaks or supply energy in absence of the sun.

Figure 3:
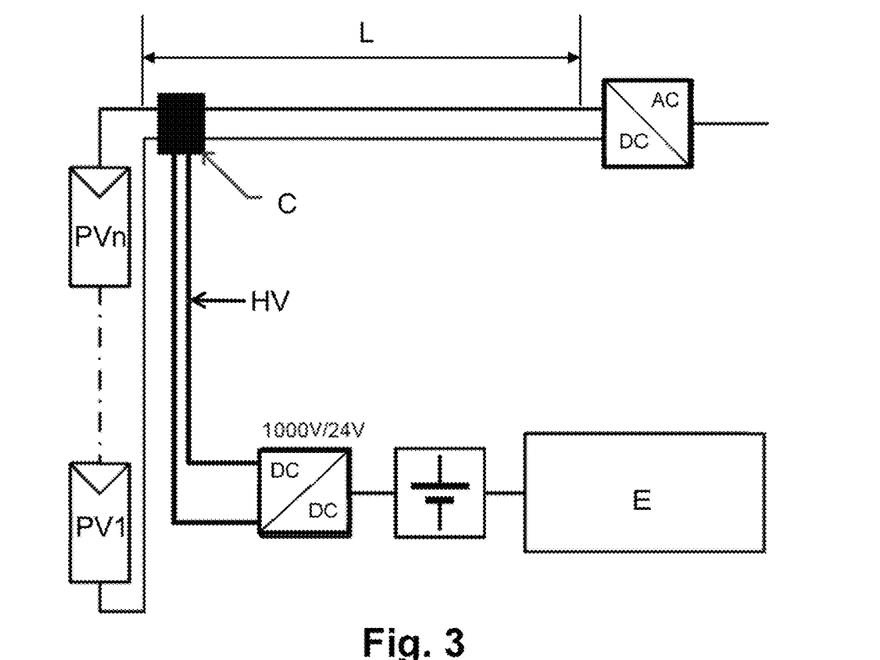
FIG. 3 shows an installation offering an alternative solution to those of FIGS. 1 and 2, also known in the state of the art, where the auxiliary power supply device takes the voltage directly from the total direct current provided by the photovoltaic panel arrangement by means of the parallel connection of a DC/DC converter which supports a high input voltage and of the corresponding high-voltage wiring.

FIG. 3 shows an example of a power supply system based on a DC/DC converter powered with the voltage from the photovoltaic generator, i.e., from the total voltage of the in-series panel arrangement PV1 . . . PVn. As can be seen, a junction box C has been included in this drawing. This box C is necessary because the panels PV1 . . . PVn are arranged to be connected in series and this junction box C is necessary in order to connect systems in parallel. It should also be noted that if there are several strings already connected in parallel, this junction box C will already be present, so it would only be necessary to leave a space for the charger and extend the high-voltage wiring HV (1000 V) to the auxiliary systems E. There are multiple connection possibilities, although it is likely that the junction box C and the auxiliary systems E are not located close to one another and therefore, to a greater or lesser extent, an additional installation will have to be provided. Another problem in this type of installation is the design of the high-input voltage DC/DC converter. This converter will require high-voltage transistors or the association of converters to reach said input voltage values. In any case, it is not a simple design, so it will increase the cost of manufacturing the converter.

Patent document EP-A2-1928077 discloses a system including a current source and a current-fed converter which receives current from said current source, where said current source is, for example, a photovoltaic energy source. The cited converter is not used for powering auxiliary systems of an energy generation plant.

Patent document EP-A-2408096 proposes a current-fed converter, where the current source can be an in-series photovoltaic panel arrangement, using the converter to extract energy from the panels, but not for powering the auxiliary systems of said photovoltaic panels.

Patent document GB-A-2476508 describes a system including a current-fed DC-DC converter connected in series with an in-series photovoltaic module arrangement, where unlike the two preceding documents the cited converter is used for generating a biasing voltage, the purpose of which is to compensate the voltage generated by the photovoltaic modules, modulating them.

None of the cited prior art documents proposes the use of a DC-DC converter to provide auxiliary systems of an electrical energy generation plant with a power supply source and the connection means.

BRIEF DESCRIPTION OF THE INVENTION

To solve the aforementioned problems, the present invention provides an installation for powering auxiliary systems in electricity generation plants, said auxiliary systems including any load operating under direct current at a constant voltage, wherein non-limiting examples could include a battery, an illumination system, an electric generating set, a controller for controlling the position of one or more solar panels or collectors of a solar farm, a weather station, safety or surveillance systems, communication systems, etc., all of them located in the electrical energy generation plant.

As in the the installations already known in the state of the art, the installation whereby this invention is implemented comprises:
- a DC-generating arrangement formed by a plurality of electrical generators which are connected in series and located inside a local area, which supply a remote area with a global direct current with a voltage that is the sum of the voltage provided by each of the mentioned electrical generators which provide, as a whole, a supply of energy through end terminals of said DC-generating arrangement; and
- an auxiliary power supply device which is located inside said local area and which supplies the auxiliary systems with a supply voltage in said local area.

Unlike the solutions proposed in the state of the art, in the proposed installation the auxiliary power supply device characteristically comprises a current-fed power converter electrically connected in series through respective input terminals in the mentioned DC-generating arrangement between any two connection points of said plurality of electrical generators connected in series, in line, and located inside the local area occupied by the electrical energy generation plant.

In a preferred embodiment, the mentioned electrical generators are photovoltaic panels.

As far as the input terminals of the current-fed power converter, they can be removably connected, in one embodiment, to the cited two connection points of the DC-generating arrangement, and alternatively they can be connected to two other connection points thereof. This grants great flexibility when it comes to obtaining energy for auxiliary loads in any location of a DC or photovoltaic (PV) installation, for example.

Advantageously, the auxiliary power supply device is mobile, and can therefore be moved to any two connection points of the DC-generating arrangement.

Through the present invention, auxiliary electronics, i.e., auxiliary systems located in the local area where the electricity generation plant is located, can be powered, not by the voltage provided by all the generators arranged in series, but by the current circulating through them. This power supply method does not affect significantly the generation of any of the panels in particular, and access to the junction box is not required since the power converter is connected as if it were another panel; it will only be necessary to provide the power converter with connectors similar to those of the panels, which would in turn facilitate installation. The voltages supported by the components of the power converter will be of the order of the voltage at its output (possibly 24/48 V), so the components of the power converter have a lower cost than the components used in conventional proposals. Furthermore, current feeding can be done from any point by opening the row of generators or the string, wherever necessary, usually in the area closer to the auxiliary systems, so as to reduce the need to lay cables as much as possible.

According to one embodiment, the auxiliary power supply device comprises a system for protection against overvoltages which short-circuits the input terminals of the current-fed power converter when it detects a voltage between the output terminals above a given threshold, said mechanism for protection against overvoltages generally comprising at least one switch.

According to a preferred embodiment, the system for protection against overvoltages also comprises a control circuit for said switch, both working independently with regards to the current-fed power converter, since they are unable to use energy from the output of the power converter as they protect the latter from malfunctioning.

To that end, according to a preferred variant of said embodiment, both the switch and the control circuit are both connected between the two input terminals of the current-fed power converter, the control circuit being powered directly by the electrical energy available between the two connection points of the DC-generating arrangement to which the input terminals of the current-fed power converter are connected.

Advantageously, the mentioned switch is a thyristor and the control circuit is a firing circuit thereof, which measures the voltage existing between the two input terminals of the current-fed power converter and fires the thyristor (i.e., causes it to transition to a conducting state) when said voltage exceeds said given threshold.

It must be mentioned that if the auxiliary power supply device were destroyed, the installation would remain in open circuit and it could represent a significant loss in energy collection. To prevent this problem, the auxiliary power supply device of the present invention includes, according to one embodiment, a circuit which prevents the power converter from remaining open and which furthermore allows it to be hooked up again to the power supply system (i.e., to the DC-generating arrangement) if the firing of the protection, i.e., of the thyristor, was erroneous for any reason (interferences, transients, etc.).

Such circuit is a latch-up circuit associated with the mentioned mechanism for protection against overvoltages and is configured to open the thyristor when the voltage between the input terminals of the current-fed power converter is equal to or lower than the cited given threshold, causing the current circulating through the DC-generating arrangement to feed current back into the current-fed power converter.

According to one embodiment, said latch-up circuit comprises at least one normally open thermal switch in thermal contact with the thyristor and connected electrically in parallel therewith, the thermal switch being configured to close every time the temperature reaches its closing temperature and to open when the temperature drops to its opening temperature.

Advantageously, both the thyristor and the thermal switch comprise respective enclosures which are in thermal contact with one another through a good heat-conducting element, such as a heat sink.

Likewise, in one embodiment the auxiliary power supply device comprises a system for protection against reverse bias connected between the input terminals of the current-fed power converter which, for a simpler variant the sole purpose of which is to allow the passage of the current in case of a poor connection, comprises a diode reversely connected between the input terminals of the current-fed power converter, and for a variant whose purpose is to allow the current-fed power converter to work with input currents of any polarity the mechanism for protection against reverse bias comprises a diode bridge.

In one embodiment, the current-fed power converter comprises or is connected to a damped capacitor-input filter.

Depending on the embodiment, the current-fed power converter is a converter with or without galvanic insulation or a converter with two or more stages where the first stage does not have galvanic insulation but at least the second stage does.

In general, the mentioned converter without galvanic insulation or, as the case may be, the mentioned first stage of said converter with two or more stages generally has a step-up topology.

Preferably, the current-fed power converter is a DC/DC converter, although for another embodiment the current-fed power converter is a DC/AC converter, i.e., an inverter.

In one embodiment, the mentioned DC/DC converter acts as the charger of one or more batteries (for example a battery bank), for which the auxiliary power supply device comprises control means for the DC/DC converter that are suitable for controlling it so that it produces an output signal with limited current and a voltage that can be adjusted depending on the battery/batteries to be charged.

BRIEF DESCRIPTION OF THE DRAWINGS

The foregoing and other advantages and features will be better understood based on the following detailed description of several embodiments in reference to some of the attached drawings (other drawings, particularly those illustrated in FIGS. 1 to 3, represent the state of the art and have been described in a preceding section) which must be interpreted in an illustrative and non-limiting manner, in which.

DETAILED DESCRIPTION OF SEVERAL EMBODIMENTS

Figure 4:
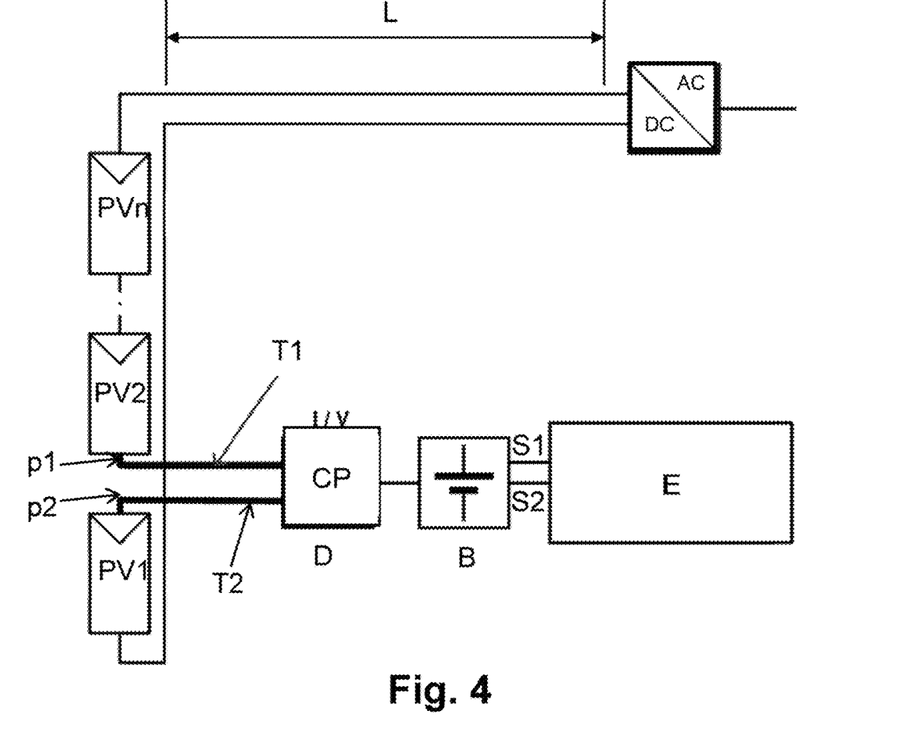
FIG. 4 shows the installation proposed by the present invention in one embodiment with a current-fed power converter of the auxiliary power supply device which is a DC/DC converter and powers the auxiliary systems through a battery interposed there between, and wherein the installation comprises a single in-series photovoltaic panel arrangement.

FIG. 4 shows an embodiment of the installation proposed by the present invention, for which it includes:
- a DC-generating arrangement made up of a plurality of generators or photovoltaic panels PV1 . . . PVn which are connected in series and located inside a local area, and envisaged to supply electrical energy to a remote area and specifically for providing a total direct current with a voltage that is the sum of the current generated by each of said generators or photovoltaic panels PV1 . . . PVn through end terminals of the DC-generating arrangement located in said remote area, which is located at a distance L of several tens or hundreds of meters; and
- an auxiliary power supply device D which is arranged inside the local area and provides the auxiliary systems E (in this case through a battery B) with a supply voltage in said local area, and said auxiliary power supply device D comprising a current-fed power converter CP electrically connected in series, respective input terminals T1, T2 in the DC-generating arrangement between any two connection points p1, p2 thereof located inside the local area, particularly between panels PV1 and PV2.

Figure 4A:
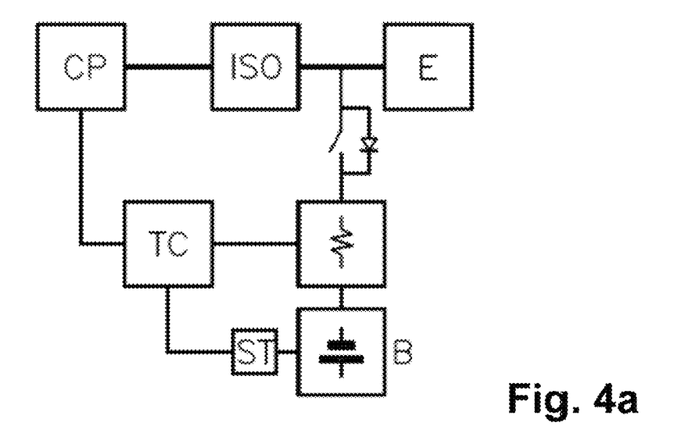
FIG. 4a shows an embodiment in which it has been envisaged that the auxiliary power supply device can supply electrical energy directly to auxiliary systems E and also power one or more batteries (which will also be able to power the mentioned auxiliary systems E, when required), with means for controlling the charging of said battery and protecting it.

FIG. 4a shows an embodiment in which the power converter CP is connected through a galvanic insulation stage ISO directly to auxiliary systems E of the types indicated, and by means of a selective control switch said power supply can also be shunted to a battery or battery bank B. A measuring unit for measuring the current delivered to the battery arranged after said switch as well as a temperature sensor ST and a temperature comparator TC (comparing the temperature of the battery with the temperature of the converter CP) have been envisaged in this arrangement, all for the purpose of protecting said battery against insufficient charging by means of a control center acquiring said temperature and load current values. A diode arranged in parallel with the mentioned switch has also been envisaged such that the battery will be powered at all times but in a limited manner. The battery or battery bank will be used to power, also through the mentioned switch, the auxiliary systems or load at the time when energy cannot be extracted from the electrical energy generation plant.

Figure 6:
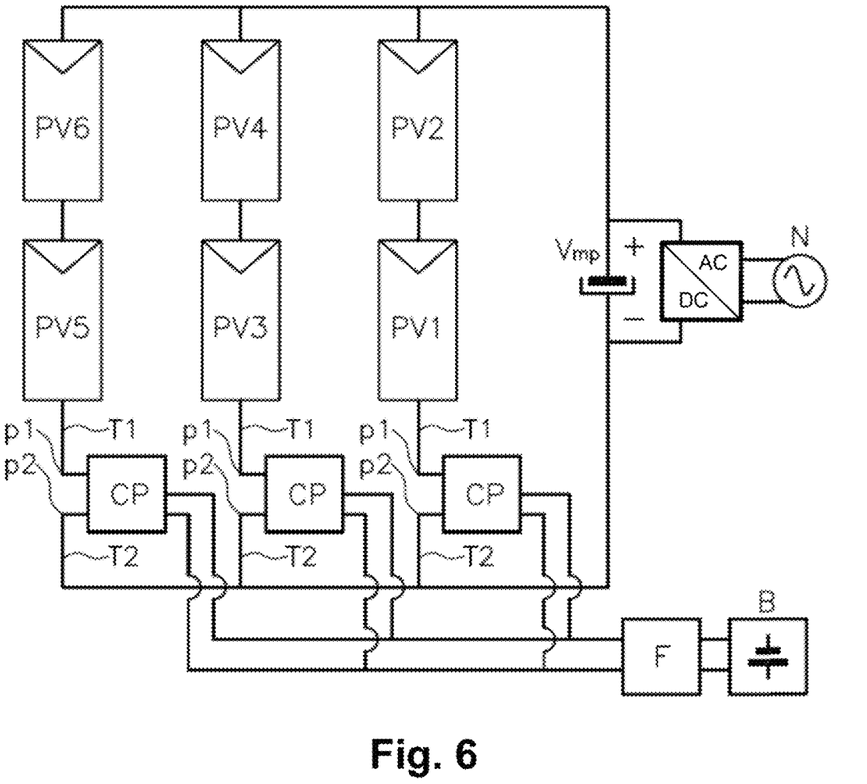
FIG. 6 shows the installation proposed by the present invention in one embodiment which differs from the embodiment of FIG. 4, mainly in that the installation is provided with several in-series photovoltaic panel arrangements connected in parallel, the current-fed power converter of the auxiliary power supply device being interconnected with each of the in-series arrangements and the outlets being connected in parallel.

FIG. 6 illustrates another embodiment in which the installation is provided with three in-series photovoltaic panel arrangements connected in parallel, each of said arrangements having in particular two panels (PV1, PV2; PV3, Pv4; PV5, PV6), a current-fed power converter CP being arranged connected to each of the in-series arrangements, particularly at a point before the panels PV1, PV3 and PV5 and powering an auxiliary power supply device or load in parallel through a concentrator F.

Figure 5:
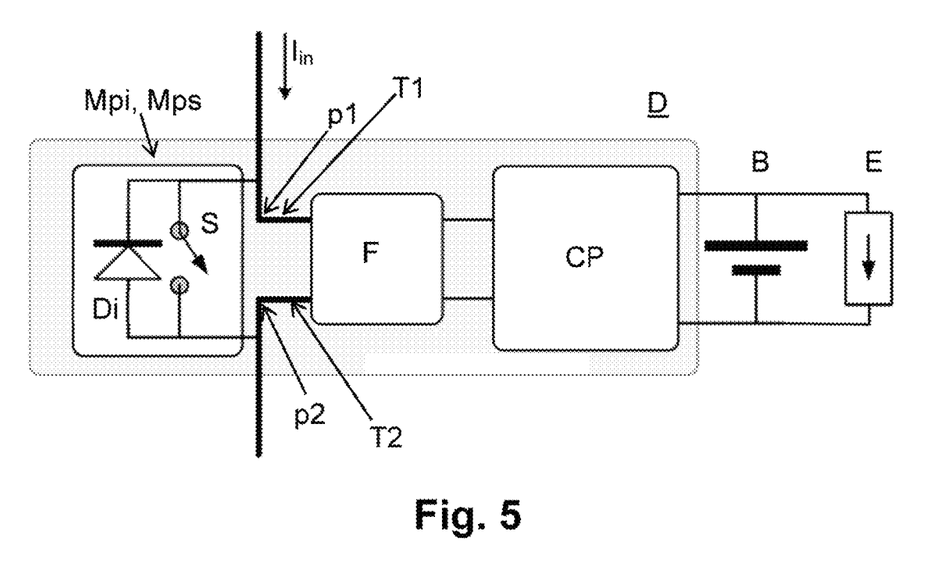
FIG. 5 shows an embodiment of the auxiliary power supply device of the installation proposed by the present invention which comprises, in addition to the current-fed power converter, mechanisms or systems for protection against overvoltage and reverse bias, as well as an input filter.

Depending on the embodiment, the auxiliary power supply device D of the present invention comprises as illustrated in FIG. 5:

Input protection Mpi, Mps (only in applications in which it is required).

Input filter F.

DC/DC or DC/AC converter.

Battery B (only in applications in which it is required).

The device D is connected in series with the solar panels PV1 ... PVn such that the current L. of the panels circulates, for example, in the direction indicated in FIG. 5. The converter CP is therefore current-fed given that the input filter F is designed to eliminate high-frequency interferences (EMI). The converter CP can maintain a constant voltage at the output and limit the current in order to act as a battery charger, if necessary.

In some embodiments, the device D comprises input protection circuits which protect the input of the converter CP and perform three functions:

1. Preventing damage to the converter CP as a result of confusion that arises when connecting the input terminals. This protection is achieved with the so-called mechanism for protection against reverse bias Mpi mentioned above.
2. Preventing overvoltages in the input of the converter CP. This protection is achieved with the so-called mechanism for protection against overvoltages Mps mentioned above.
3. In the event of a fault, preventing the installation from remaining in open circuit. This protection is achieved with the so-called latch-up circuit mentioned above.

The mentioned input protection circuits and their purpose are described below.

FIG. 6 shows an example of a grid-connected installation, where a DC/DC current-fed converter CP has been connected as a battery charger. The converter CP used in the example does not have the input protection circuit included in the solution proposed for some embodiments of the present invention, so in the event of a fault or poor connection, not only would the systems be damaged, but rather all the generators connected in series with the panel (PV1 and PV2) would be disconnected from the installation, with a resulting energy loss.

The following protections have been included to prevent possible disconnections from the installation:

Reverse bias

Overvoltage

Latch up

Protection against reverse bias can be achieved in different ways depending on whether the operation of the converter CP is to be maintained or prevent the installation from remaining in open circuit. To that end, as described in a preceding section, a mechanism for protection against reverse bias, Mpi, is used.

Figure 7:
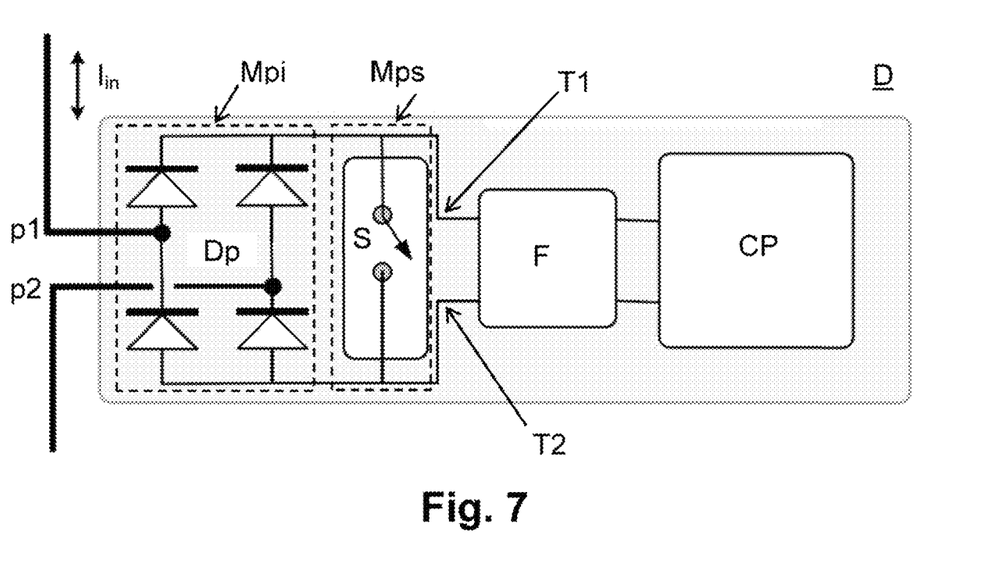
FIG. 7 shows another embodiment of the auxiliary power supply device of the proposed installation which differs from the embodiment of FIG. 5 mainly in that the mechanism for protection against reverse bias comprises, instead of a single diode, a diode bridge which allows the current-fed power converter to work with input currents of any polarity.

If the system must work (depending on the application) with input currents in any direction (positive or negative), the mechanism Mpi comprises a diode bridge Dp at the input of the converter CP, as shown in FIG. 7. However, given that the current that usually circulates through these conductors, this may be a solution which significantly reduces the performance of the converter CP. If only one diode Di which allows the passage of current in the event of a poor connection is used, as shown in FIG. 5, the performance of the converter CP will not be affected, although the converter, in this case a DC/DC converter, will be bypassed and will not be able to power the loads L connected to it.

Figure 8:
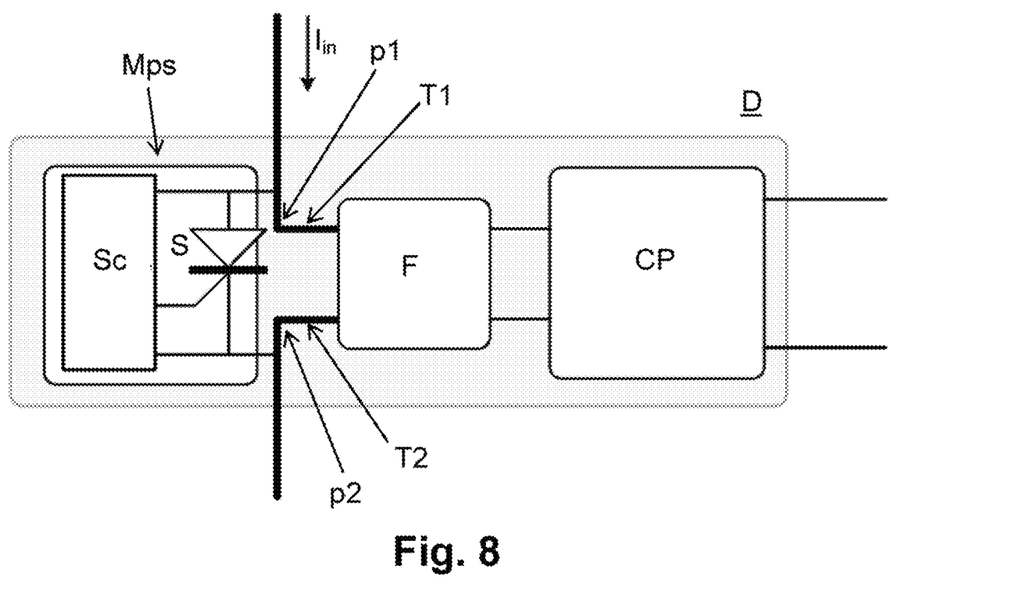
FIG. 8 shows another embodiment of the auxiliary power supply device of the proposed installation in which it comprises a mechanism for protection against overvoltages including a thyristor and its corresponding firing circuit.

On the other hand, if the converter CP no longer works properly, the voltages which may appear at its input are very high. To that end, as indicated in a preceding section, the present invention comprises a mechanism for protection against overvoltages, Mps, generally comprising a switch S (FIGS. 5, 7, 8, and 9) which must be closed at the time when the input voltage $V_{in}$ (see FIG. 6) exceeds a given value. The control circuit for the switch S as well as the switch S itself must work regardless of the rest of the power supply device D. This circuit cannot use energy from the output of the converter CP or the batteries B as it protects them from malfunctioning. The chosen solution, shown in FIG. 8, where the switch S has been implemented by means of a thyristor, whose firing circuit Sc takes the energy from the input itself and not from the converter CP. Once the thyristor S has been fired, it does not need energy to remain closed. This behavior is both an advantage and a drawback. On one hand, it allows keeping the switch S closed in the absence of energy for powering same, however, in the event of an accidental firing, it would leave the converter CP without any power supply until the input current $I_{in}$ is cancelled. It would be necessary to wait until the next day or to interrupt the current circulation momentarily in order to cancel the input current $I_{in}$ (or to lower the maintenance threshold of the thyristor S).

To prevent having to stop the installation or to lose power supply for an entire day, a latch-up circuit is proposed. As in the preceding case, this circuit cannot be powered by the converter CP or the battery B.

Figure 9:
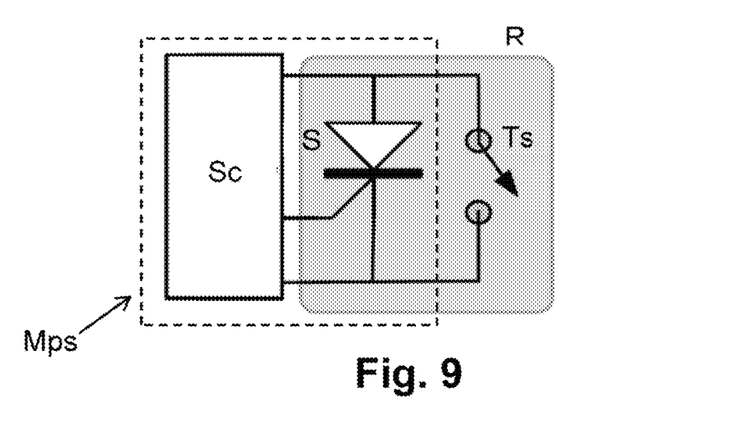
FIG. 9 shows in detail the mechanism for protection against overvoltages of FIG. 8 in one embodiment in which the thyristor is associated with a latch-up circuit formed by a thermal switch.

By means of such a latch-up circuit, the energy used for extinguishing conduction in the thyristor S is the actual thermal energy generated in the thyristor S due to the passage of current there through. To that end, a normally open thermal switch Ts is electrically connected in parallel with the semiconductor device S. Both the enclosure of the thyristor S and the enclosure of the thermal switch Ts will be in close contact through a good heat-conducting surface, for example a small heat sink R, as shown in FIG. 9. When the temperature of the assembly reaches the firing temperature of the thermal switch Ts, said thermal switch Ts will close and provide a low-impedance path for the current previously circulating through the thyristor S. The current in the thyristor S will be canceled and the component will remain as an open switch. Given that the energy dissipated in the thermal switch Ts is less than the energy dissipated through the thyristor S, the thyristor-thermal switch assembly will gradually cool down until reaching the temperature at which the switch S returns to its standby (open) state. At that very instant, if the electronics react properly the converter CP will work normally; if the fault persists the voltage will again exceed the maximum input value and the thyristor S will again be fired.

Figure 10:
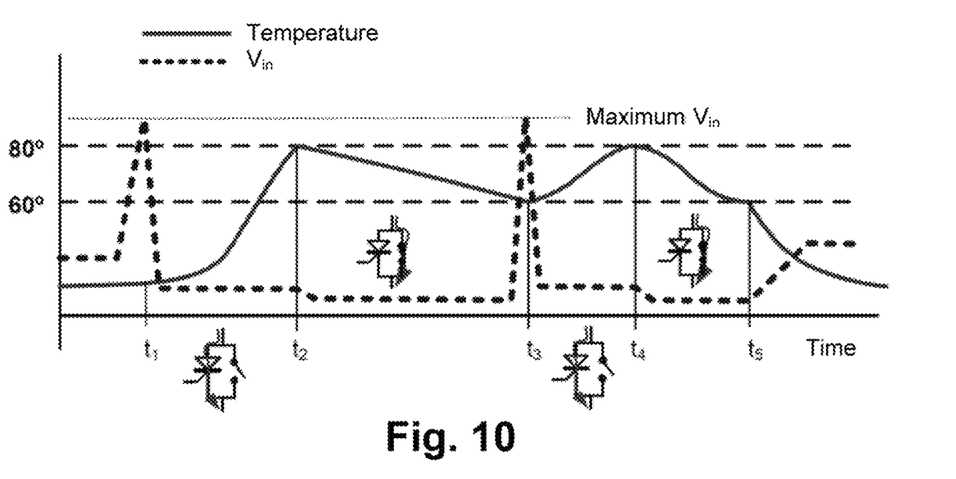
FIG. 10 is a graph illustrating, by means of respective waves, the operation of the assembly of FIG. 9 for overcoming overvoltage peaks by means of the thyristor and for unblocking the thyristor by means of the latch-up circuit.

The example shown in FIG. 10 is set forth so as to better understand the operation of the latch-up circuit or mechanism and the protection against overvoltage. The voltage at the input of the converter CP is depicted with a thick dashed line and the temperature of the thyristor-switch assembly is depicted with a thick solid line. The firing limits of the normally open thermal switch Ts have also been indicated. For whatever reason, in instant $t_1$ the input voltage $V_{in}$ exceeds the maximum allowable input voltage (maximum $V_{in}$), which fires the thyristor S and limits the input voltage $V_{in}$ to the conduction voltage of the thyristor S (about 1.3 volts). In interval $t_1$-$t_2$, the current $I_{in}$ will circulate through the thyristor S and the temperature of the assembly will start to rise. In instant $t_2$, the temperature of the thermal switch Ts exceeds the maximum threshold and the switch closes, so the current circulates through the thermal switch Ts instead of circulating through the thyristor S, and the dissipated energy decreases until the thermal switch Ts opens again in $t_3$. In $t_3$, the error caused by overvoltage has not been resolved, so the voltage increases again to the maximum allowed voltage (maximum $V_{in}$) and firing of the thyristor S restarts, which again heats it up until in $t_4$ it has reached a higher firing temperature (80° C.) of the thermal switch Ts, so the switch closes, and the thyristor S therefore opens again. Finally in $t_5$, since the temperature of the thyristor-switch assembly has dropped to a lower firing temperature (60° C.) of the thermal switch Ts, the switch opens, and since the problem of overvoltage in the converter CP has fortunately been resolved this time, the thyristor S is not fired again, so the converter CP continues with its normal operation where it is powered with $I_{in}$.

Figure 11:
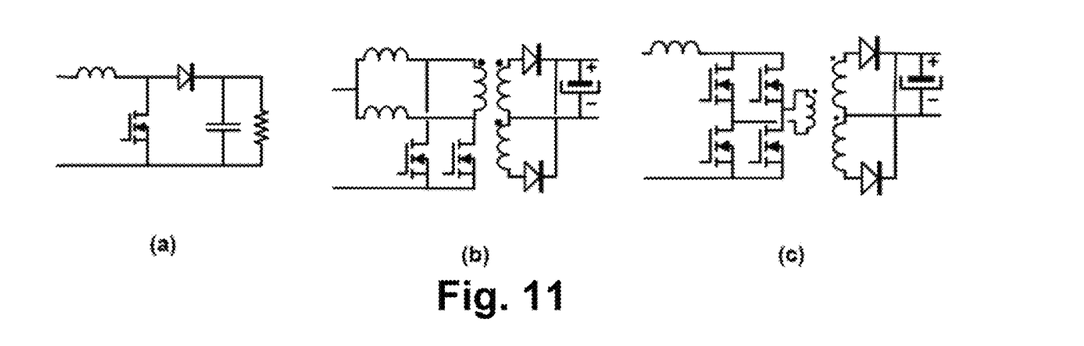
FIGS. 11(a), 11(b), and 11(c) show three respective examples of the possible implementations of the current-fed power converter of the present invention, when the latter is a DC/DC converter having a step-up topology.

There can be a very wide range of converters CP that, however, must always be current-fed, so in the absence of consumption, these converters must behave almost like a closed circuit. To that end, it is recommendable to use power conversion topologies derived from the "step-up" family. The simplest case would be a DC-DC boost converter. Suitable topologies include those shown in FIG. 11 as well as all the topologies derived therefrom with smooth or resonant switching and even with synchronous rectification. Current-fed resonant inverters may also be a suitable option.

Figure 12:
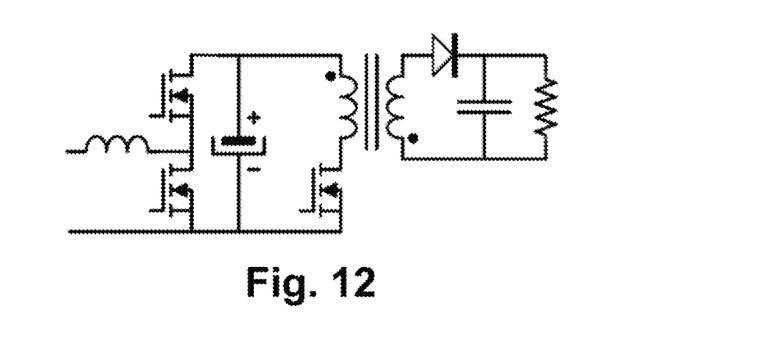
FIG. 12 shows a two-stage topology implemented in the current-fed power converter included in another embodiment of the present invention.

Combinations of converters can also be used, where the first stage will generally be a boost converter without insulation and the second stage a converter with any kind of insulation (buck, buck-boost, bridging means, etc.). FIG. 12 shows an example of a two-stage converter formed by a booster with synchronous rectification to reduce losses in the rectification and a buck-boost converter with insulation (fly-back).

Given that the power converter CP can be used as a battery charger, it must be provided in one embodiment with a double control loop which allows limiting the current. To increase the service life of the battery B, the converter CP optionally includes a temperature sensor for adjusting the output voltage according to the technology of the battery.

Topologies with insulation grant a more reliable power supply and are advisable if the powered systems E must be handled by operators. In the case of using topologies without insulation, it is recommended to include a mechanism which assures the physical disconnection of the converter CP when handling the same.

If insulation is not required, this clearly constitutes the most economical solution possible because designing a converter similar to the one shown in FIG. 11(a) with low-voltage components will suffice. In these conditions, this solution would be highly competitive since the cost of the converter CP would be very low.

Almost all the solutions proposed for the converter CP have an input coil (see FIGS. 11 and 12), so the current form of panels PV1 . . . PVn will barely be modified. In any case, a significant voltage ripple can indeed appear in the input of the converter. To that end, in one embodiment the device D includes a small damped capacitor-input filter F (see FIGS. 5, 7, and 8). On the other hand, this input filter F will prevent the firing of the thyristor S of the mechanism for protection against overvoltages Mps as a result of sudden voltage changes.

A person skilled in the art may introduce changes and modifications in the described embodiments without departing from the scope of the invention as defined in the following claims.

The invention claimed is:

1. An installation for powering auxiliary systems in electricity generation plants, wherein said auxiliary systems can be any load operating with direct current at a constant voltage, including a battery, a controller for controlling the position of one or more solar panels or collectors, an illumination system, an electric generating set, a weather station, safety or surveillance systems, or communication systems, installed inside or adjacent to the electricity generation plant, the installation comprising:
   a DC-generating arrangement formed by a plurality of electrical generators connected in series and located inside a local area, and envisaged for supplying a remote area with a global direct current with a voltage that is the sum of the voltage provided by each of said electrical generators providing, as a whole, a supply of energy through end terminals of said DC-generating arrangement; and
   an auxiliary power supply device which is arranged inside said local area and provides the auxiliary systems with a supply voltage in said local area;
said installation being wherein said auxiliary power supply device is made up of a current-fed power converter which is electrically connected in series through respective input terminals to said DC-generating arrangement between any two connection points of said plurality of electrical generators connected in series, located inside the local area.

2. The installation according to claim 1, wherein said electrical generators are photovoltaic panels.

3. The installation according to claim 1, wherein said input terminals of said current-fed power converter are removably connected to said two connection points of the DC-generating arrangement, allowing alternative connections thereof to two other connection points between two electrical generators of said plurality of electrical generators.

4. The installation according to claim 3, wherein the auxiliary power supply device is mobile.

5. The installation according to claim 1, wherein said current-fed power converter is a DC/DC converter.

6. The installation according to claim 5, wherein said DC/DC converter acts as a charger for one or more batteries, for which it comprises control means for the DC/DC converter that are suitable for providing an output signal with the current limited to its value and with a voltage that can be adjusted depending on the battery or batteries to be charged.

7. The installation according to claim 1, wherein said current-fed power converter is an inverter or a DC/AC converter.

8. The installation according to claim 1, wherein the auxiliary power supply device comprises a system for protection against overvoltages which short-circuits the input terminals of the current-fed power converter when it detects a voltage between said terminals with a value above a predetermined threshold.

9. The installation according to claim 1, wherein the auxiliary power supply device comprises a system for protection against overvoltages which short-circuits the input terminals of the current-fed power converter when it detects a voltage between the output terminals thereof having a value above a predetermined threshold.

10. The installation according to claim 1, wherein the auxiliary power supply device comprises a system for protection against overvoltages configured to be remotely activated by means of a digital input and that short-circuits the input terminals of the current-fed power converter.

11. The installation according to claim 1, wherein a system for protection against overvoltages is included, said system for protection against overvoltages comprising at least one switch and a control circuit for said switch, both working independently with regards to the current-fed power converter.

12. The installation according to claim 11, wherein said switch and said control circuit are both connected between the two input terminals of the current-fed power converter, the control circuit being powered directly by the electrical energy available between the two connection points of the DC-generating arrangement to which the input terminals of the current-fed power converter are connected.

13. The installation according to claim 12, wherein said switch is a thyristor and said control circuit is a firing circuit thereof which measures the voltage existing between the two input terminals of the current-fed power converter and fires the thyristor when the voltage exceeds said given threshold.

14. The installation according to claim 13, wherein it comprises a latch-up circuit associated with said system for protection against overvoltages and configured for opening the thyristor when the voltage between the input terminals of the current-fed power converter is equal to or lower than said given threshold and causing the current circulating through the DC-generating arrangement to feed the current-fed power converter with current.

15. The installation according to claim 14, wherein said latch-up circuit comprises at least one normally open thermal switch in thermal contact with the thyristor and electrically connected in parallel therewith, said thermal switch being configured to close every time the temperature reaches its closing temperature and to open when the temperature drops to its opening temperature.

16. The installation according to claim 13, characterized in that wherein both the thyristor and the thermal switch comprise respective enclosures which are in thermal contact with one another through a good heat-conducting element comprising at least one heat sink.

17. The installation according to claim 1, wherein the auxiliary power supply device further comprises a system for protection against reverse bias connected between the input terminals of the current-fed power converter.

18. The installation according to claim 17, wherein said system for protection against reverse bias comprises a diode reversely connected between the input terminals of the current-fed power converter.

19. The installation according to claim 17, wherein said system for protection against reverse bias comprises a diode bridge connected between the input terminals of the current-fed power converter, allowing the passage of current to the current-fed power converter in both directions.

20. The installation according to claim 1, wherein the current-fed power converter comprises or is connected to a damped capacitor-input filter.

21. The installation according to claim 1, wherein the current-fed power converter is a converter without galvanic insulation or a converter with two or more stages wherein the first stage does not have galvanic insulation but at least the second stage does.

22. The installation according to claim 21, wherein said converter without galvanic insulation, or said first stage of said converter with two or more stages, has a step-up topology.

23. The installation according to claim 1, wherein said converter is connected to said auxiliary system or load directly to a battery through a control arrangement comprising a switch that can be selectively operated and a diode, having provided in this connection arrangement a measuring unit for measuring the current delivered to the battery arranged after said switch, as well as a temperature sensor for said battery, and a temperature comparator between the converters and the battery, to protect said battery against insufficient charging by means of a control center acquiring said temperature and load current values, the battery alternately powering said auxiliary systems through the mentioned switch.

* * * * *